US012801589B2

(12) United States Patent
Koshutanski et al.

(10) Patent No.: US 12,801,589 B2
(45) Date of Patent: Nov. 17, 2026

(54) ANOMALY DETECTION METHOD

(71) Applicant: BULL SAS, Les-Clayes-sous-Bois (FR)

(72) Inventors: Hristo Koshutanski, Madrid (ES); Alejandro Garcia Bedoya, Seville (ES)

(73) Assignee: BULL SAS, Les-Clayes-sous-Bois (FR)

( * ) Notice: Subject to any disclaimer, the term of this patent is extended or adjusted under 35 U.S.C. 154(b) by 0 days.

(21) Appl. No.: 19/211,096

(22) Filed: May 16, 2025

(65) Prior Publication Data

US 2025/0363091 A1 Nov. 27, 2025

(30) Foreign Application Priority Data

May 22, 2024 (EP) .................................... 24305799

(51) Int. Cl.
*G06F 16/23* (2019.01)
*G06F 11/30* (2006.01)
*G06F 11/34* (2006.01)
*G06N 20/00* (2019.01)

(52) U.S. Cl.
CPC ...... *G06F 16/2365* (2019.01); *G06F 11/3006* (2013.01); *G06F 11/3447* (2013.01); *G06N 20/00* (2019.01)

(58) Field of Classification Search
CPC ............ G06F 16/2365; G06F 11/3006; G06F 11/3447; G06F 21/50; G06F 21/552; G06N 20/00; H04L 63/1425
See application file for complete search history.

(56) References Cited

U.S. PATENT DOCUMENTS

| | | | | |
|---|---|---|---|---|
| 2021/0248613 | A1* | 8/2021 | Zhou | G06F 9/542 |
| 2022/0253699 | A1 | 8/2022 | Hoshen et al. | |
| 2022/0391754 | A1 | 12/2022 | Guo et al. | |
| 2023/0083443 | A1* | 3/2023 | Saveliev | G06N 20/00 726/23 |
| 2023/0325226 | A1* | 10/2023 | Malik | G06F 9/45558 718/1 |

(Continued)

OTHER PUBLICATIONS

European Search Report issued in EP24305799 dated Oct. 15, 2024 (9 pages).

*Primary Examiner* — Dangelino N Gortayo
(74) *Attorney, Agent, or Firm* — ARC IP Law, PC; Joseph J. Mayo

(57) ABSTRACT

The invention relates to a method for detecting anomalies in a data stream. The method including a training step comprising, based on at least one reference data stream, computing a value of at least one predetermined non-conformity feature, thereby obtaining a conformity index; for each reference data stream, computing a reference behavioral dataset including, for at least one predetermined behavioral feature, a value of said behavioral feature computed based on said reference data stream, The training step also includes, for each reference data stream, generating a respective reference augmented behavioral dataset including the respective reference behavioral dataset and, for each non-conformity feature, a respective deviation value equal to zero; and training an artificial intelligence model based on each reference augmented behavioral dataset, each reference augmented behavioral dataset being associated with information indicative of the absence of anomaly in the corresponding reference data stream.

7 Claims, 2 Drawing Sheets

(56) References Cited

U.S. PATENT DOCUMENTS

| | | | | |
|---|---|---|---|---|
| 2023/0344841 | A1* | 10/2023 | Tambuluri .......... | H04L 63/1416 |
| 2024/0036963 | A1 | 2/2024 | Azeez et al. | |
| 2025/0190291 | A1* | 6/2025 | O'Connor ........... | G06F 11/0751 |

* cited by examiner

ANOMALY DETECTION METHOD

This application claims priority to European Patent Application Number 24305799.9, filed 22 May 2024, the specification of which is hereby incorporated herein by reference.

BACKGROUND OF THE INVENTION

Field of the Invention

At least one embodiment of the invention relates to a computer-implemented anomaly detection method for detecting anomalies in a data stream.

At least one embodiment of the invention further relates to a computer program and to a system for performing anomaly detection.

At least one embodiment of the invention applies to the field of anomaly detection.

Description of the Related Art

Anomaly detection aims to identify, within a data stream, data points, items, events or observations which deviate significantly from the majority of the remaining data, or that do not comply with a behavior that is qualified as "normal".

Anomaly detection has a wide range of applications, from financial transactions and cybersecurity monitoring to computer vision surveillance and patient health monitoring, to name a few.

Obviously, the definition of normal and abnormal behavior varies across application domains and their contexts. For instance, in the context of cybersecurity, an anomaly can relate to suspicious communications (for instance, when a device suddenly communicates with unusual IP addresses), or suspicious frequency of login attempts from one device to another device or service. In the context of financial transactions, an anomaly (which may be indicative of a fraud) may relate to an abnormal behavior during an online payment transaction, for instance based on transaction amount, geographic location, and time of day.

During recent years, the data produced and generated by IT systems have exponentially increased in volume, velocity, variety, variability, and veracity (also known as "the five Vs"), representing additional challenges. Consequently, anomaly detection methods relying on artificial intelligence models have been implemented to overcome these challenges.

Said artificial intelligence models usually require that raw data first undergo a preliminary processing to extract, select or transform features presented in formats for artificial intelligence models. This process is commonly referred to as feature engineering in the artificial intelligence domain.

However, such methods are not entirely satisfactory.

Indeed, such models are generally configured to detect anomalies when a significant difference of values is observed across a set of monitored features. However, a problem arises when the value of a threshold needs to be set, since lowering the threshold for anomaly detection would make such models more sensitive to less significant deviations, thereby decreasing efficiency and performance in terms of detecting normal behavior as anomalous (false positives).

Moreover, the increasing amount of data and their nature generally results in an exponential increase in the variables that can be examined by said models, thereby resulting in heavy computational load and poor real-time performances.

A purpose of one or more embodiments of the invention is to overcome at least one of these drawbacks.

Another purpose of one or more embodiments of the invention is to provide a solution that boosts anomaly detection performance for any level of deviations (desired as anomalous) as if they were significant deviations.

Another purpose of one or more embodiments of the invention is to provide a solution that allows to efficiently capture and represent deviations while minimizing the volume of features examined by the anomaly detection models.

BRIEF SUMMARY OF THE INVENTION

To this end, at least one embodiment of the invention concerns an anomaly detection method of the aforementioned type, including a training step comprising:

- based on at least one reference data stream, each reference data stream corresponding to an operation of at least one asset without anomaly, computing a value of at least one predetermined non-conformity feature;
- for each non-conformity feature, storing the corresponding computed value as a conformity index;
- for each reference data stream, computing a reference behavioral dataset including, for at least one predetermined behavioral feature, a value of said behavioral feature computed based on said reference data stream;
- for each reference data stream, generating a respective reference augmented behavioral dataset including the respective reference behavioral dataset and, for each non-conformity feature, a respective deviation value equal to zero; and
- training an artificial intelligence model based on each reference augmented behavioral dataset, each reference augmented behavioral dataset being associated with information indicative of the absence of anomaly in the corresponding reference data stream, thereby obtaining a trained anomaly detection model.

Indeed, such non-conformity features introduce meaning in the context of deviations. More precisely, such non-conformity features are associated with a deviation value that is set to zero in the absence of deviation from a baseline, but that is activated (i.e., takes a non-zero value) only when significant (with respect to an application domain) deviations from said baseline appear.

As a result, improved detection accuracy on border areas is achieved, as well as reduced dimensionality of categorical type data with reduced complexity and processing time, and reduced amount of data needed to generalize artificial intelligence models with categorical data. Consequently, the claimed method is suitable for implementation on a variety of edge-to-cloud continuum deployment environments.

According to one or more embodiments of the invention, the method includes one or several of the following features, taken alone or in any technically possible combination:

- the method further includes an inference step comprising, for at least one monitored data stream:
  - computing a value of each predetermined non-conformity feature, based on said monitored data stream;
  - for each non-conformity feature, computing a respective deviation value based on the respective conformity index and on the computed value of said non-conformity feature;
  - computing a monitored behavioral dataset including, for each predetermined behavioral feature, a value of said behavioral feature computed based on said monitored data stream;

generating a monitored augmented behavioral dataset including the respective monitored behavioral dataset and, for each non-conformity feature, the respective computed deviation value; and providing the generated monitored augmented behavioral dataset as input to the anomaly detection model, an output of the anomaly detection model being indicative of the presence of an anomaly, or the absence thereof, in the monitored data stream;

each non-conformity feature is associated with a corresponding impact factor, the deviation value associated with each non-conformity feature being equal to a result of weighting, with the corresponding impact factor, an intermediate result computed based on the respective conformity index and on the computed value of said non-conformity feature;

at least one conformity index is associated with a corresponding index tolerance factor, the corresponding deviation value depending on the respective conformity index updated based on the associated index tolerance factor.

According to at least one embodiment of the invention, it is proposed a computer program comprising instructions, which when executed by a computer, cause the computer to carry out the steps of the method as defined above.

The computer program may be in any programming language such as C, C++, JAVA, Python, etc.

The computer program may be in machine language.

The computer program may be stored, in a non-transient memory, such as a USB stick, a flash memory, a hard-disc, a processor, a programmable electronic chip, etc.

The computer program may be stored in a computerized device such as a smartphone, a tablet, a computer, a server, etc.

According to one or more embodiments of the invention, it is proposed a system for performing anomaly detection in a monitored data stream, the system being configured, during a training step:

to compute a value of at least one predetermined non-conformity feature based on at least one reference data stream, each reference data stream corresponding to an operation of at least one asset without anomaly;

to store, for each non-conformity feature, the corresponding computed value as a conformity index;

to compute, during the training step, for each reference data stream, a reference behavioral dataset including, for at least one predetermined behavioral feature, a value of said behavioral feature being computed based on said reference data stream;

to generate, during the training step, for each reference data stream, a respective reference augmented behavioral dataset including the respective reference behavioral dataset and, for each non-conformity feature, a respective deviation value equal to zero; and to train, during the training step, an artificial intelligence model based on each reference augmented behavioral dataset, each reference augmented behavioral dataset being associated with information indicative of the absence of anomaly in the corresponding reference data stream, thereby obtaining a trained anomaly detection model.

According to at least one embodiment of the invention, the system includes the following feature:

the system is further configured, during an inference step:

to compute a value of each predetermined non-conformity feature, based on a monitored data stream;

to compute, for each non-conformity feature, a respective deviation value based on the respective conformity index and on the computed value of said non-conformity feature;

to compute a monitored behavioral dataset including, for each predetermined behavioral feature, a value of said behavioral feature computed based on said monitored data stream;

to generate a monitored augmented behavioral dataset including the respective monitored behavioral dataset and, for each non-conformity feature, the respective computed deviation value; and to provide the generated monitored augmented behavioral dataset as input to the anomaly detection model, an output of the anomaly detection model being indicative of the presence of an anomaly, or the absence thereof, in the monitored data stream.

The system may be a computing platform, server, or a device such as a smartphone, a tablet, a smartwatch, a computer, any wearable electronic device, etc.

The computing platform, server, or device according to at least one embodiment of the invention may execute one or several applications to carry out the method according to one or more embodiments of the invention.

The computing platform, server, or device according to at least one embodiment of the invention may be loaded with, and configured to execute, the computer program according to one or more embodiments of the invention.

BRIEF DESCRIPTION OF THE DRAWINGS

Other advantages and characteristics will become apparent on examination of the detailed description of an embodiment which is in no way limitative, and the attached figures, where.

DETAILED DESCRIPTION OF THE INVENTION

It is well understood that the one or more embodiments that will be described below are in no way limitative. In particular, it is possible to imagine variants of the one or more embodiments of the invention comprising only a selection of the characteristics described hereinafter, in isolation from the other characteristics described, if this selection of characteristics is sufficient to confer a technical advantage or to differentiate the one or more embodiments of the invention with respect to the state of the prior art. Such a selection comprises at least one, preferably functional, characteristic without structural details, or with only a part of the structural details if this part alone is sufficient to confer a technical advantage or to differentiate the one or more embodiments of the invention with respect to the prior art.

In the FIGURES, elements common to several figures retain the same reference.

Figure 1:
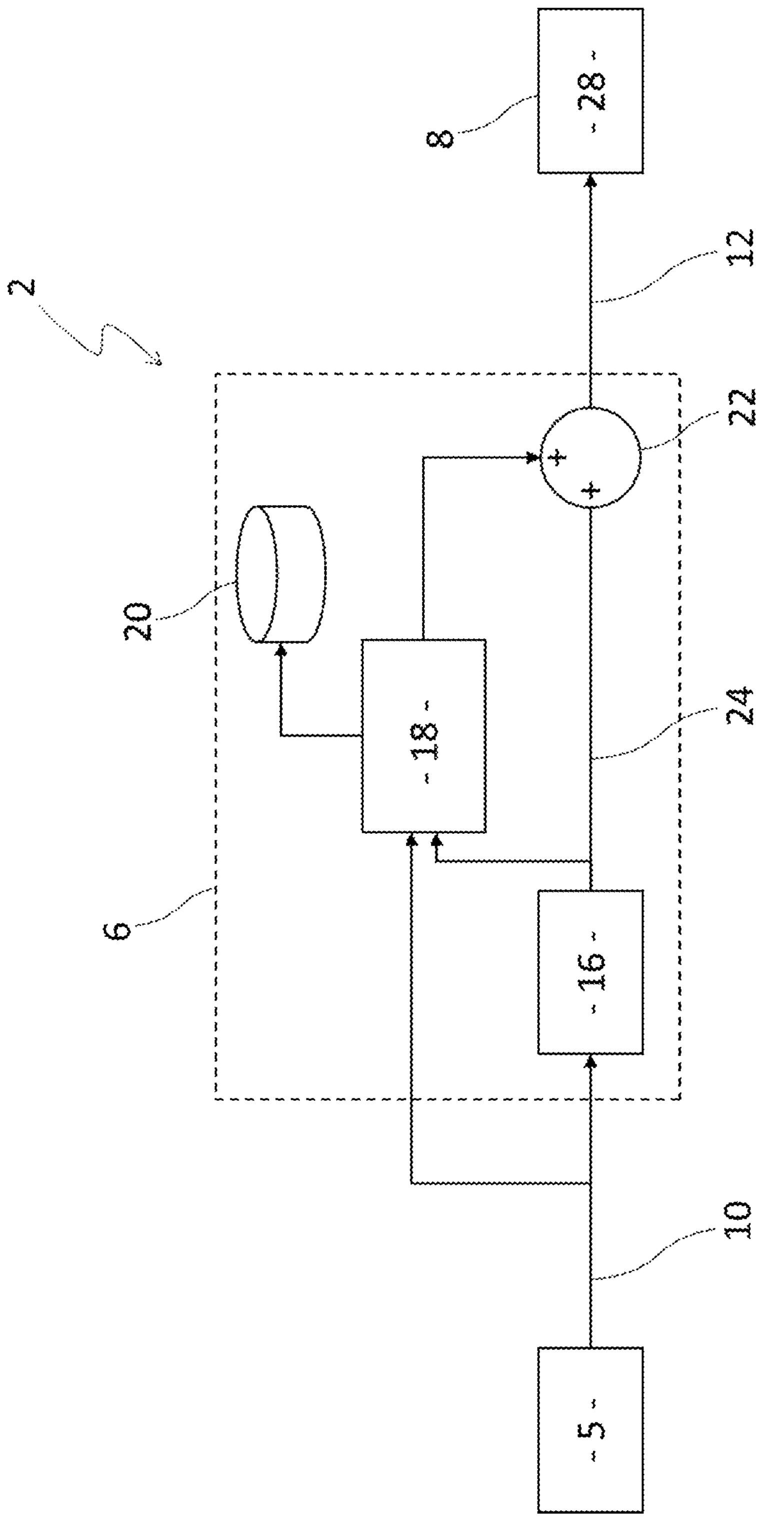
FIG. 1 is a schematic view of a system according to one or more embodiments of the invention during a training step.
Figure 2:
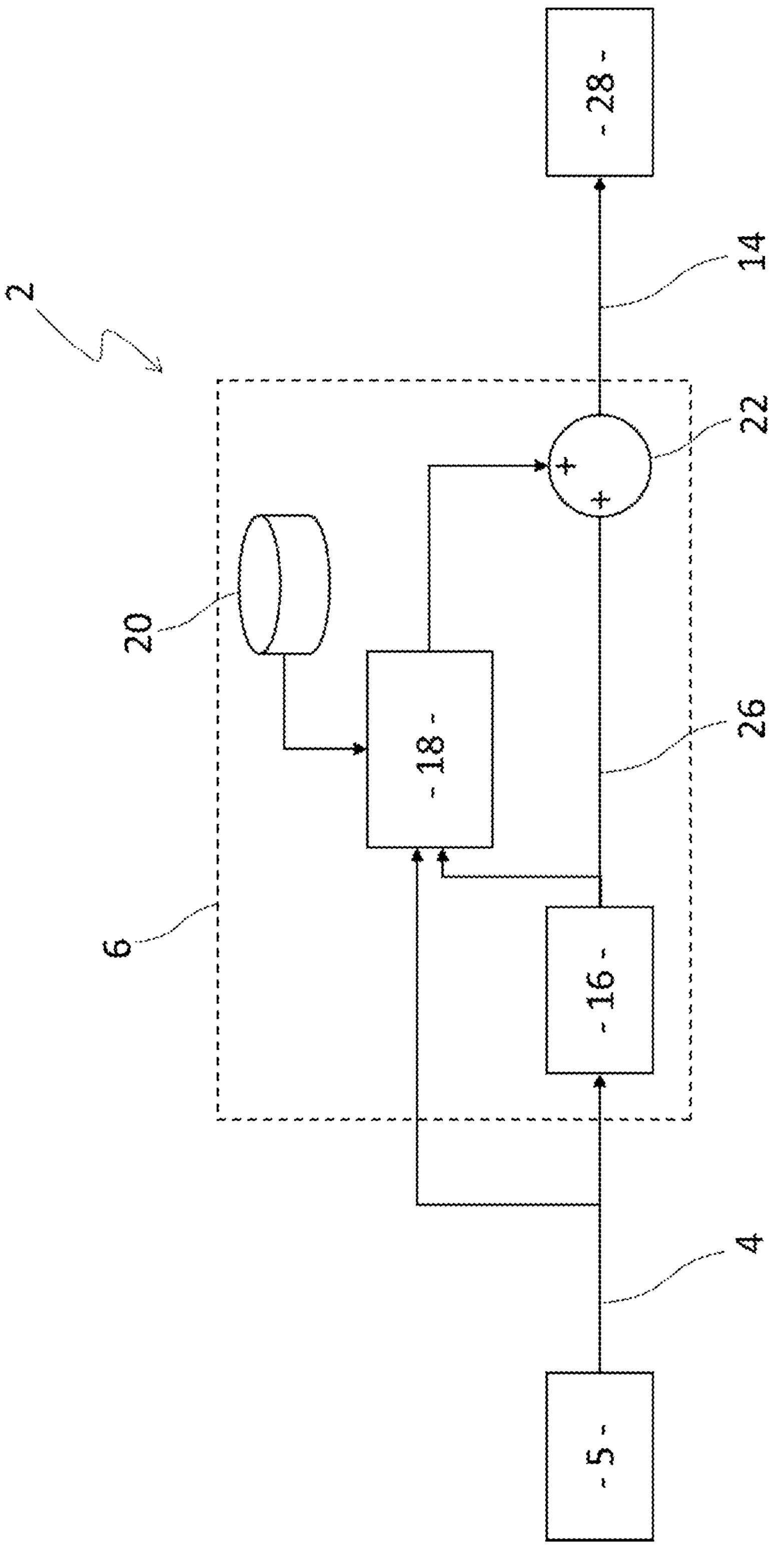
FIG. 2 is a schematic view of the system of FIG. 1, during an inference step, according to one or more embodiments of the invention.

A system 2 according to one or more embodiments of the invention is shown in FIGS. 1 and 2.

The system 2, in at least one embodiment, is designed to perform anomaly detection (that is to say to detect anomalies) in a monitored data stream 4 (FIG. 2).

Said monitored data stream 4 includes a series of observable (i.e., raw) data representative of the operation of one or several asset(s) 5 in a given monitored infrastructure or environment.

The data in the monitored data stream may be data provided by a sensor, a server, an IOT (Internet Of Things) device, and the like.

The system 2 includes a preprocessing module 6 and a prediction module 8 connected to an output of the preprocessing module 6.

FIG. 1 corresponds to the operation of the system 2 during a training step. During said training step, the system 2 computes a baseline corresponding to a normal operation of each asset 5.

Moreover, by way of at least one embodiment, FIG. 2 shows the system 2 during its operation during an inference step performed after the training step. During said inference step, the system 2 determines, based on the aforementioned baseline, whether a current operation of each asset 5 is normal or anomalous.

Preprocessing Module 6

The preprocessing module 6 is configured to receive a data stream, and to compute an augmented behavioral dataset representative of the received data stream.

More precisely, during the training step, each received data stream is a reference data stream 10, representative of the operation of the aforementioned one or several asset(s) 5 without anomaly (also referred to as a "normal operation"). In this case, the corresponding augmented behavioral dataset is referred to as a "reference augmented behavioral dataset 12" (FIG. 1).

Moreover, during the inference step, the received data stream is the aforementioned monitored data stream 4. In this case, the corresponding augmented behavioral dataset is referred to as a "monitored augmented behavioral dataset 14" (FIG. 2).

The preprocessing module 6 comprises a feature extractor 16, a conformity processor 18, a memory 20 and a formatting module 22.

Feature Extractor 16

The feature extractor 16 is configured to compute a behavioral dataset based on the data stream provided as an input to the preprocessing module 6.

More precisely, the feature extractor 16 is associated with at least one predetermined behavioral feature. In this case, for each predetermined behavioral feature, the feature extractor 16 is configured to compute, based on the input data stream 4, 10, a value of said behavioral feature.

By "behavioral feature", it is meant, in the context of one or more embodiments of the invention, a characteristic or attribute of data that describes patterns or behaviors within the input data stream received from each asset 5, and that provides information regarding the behavior or activities of said asset 5.

Such features may be numerical or categorical.

By "numerical feature", it is meant, in the context of one or more embodiments of the invention, a variable that may assume numeric values such as real numbers or integers. Such feature may represent a quantity or a measurement, for instance a duration, a temperature, voltage, a number of packets per second, a number of financial transactions per second, etc.

By "categorical feature", it is meant, in the context of one or more embodiments of the invention, a variable that may only assume a limited, predetermined number of possible values representing different categories or groups, such as a range of IP (Internet Protocol) addresses in a given environment, protocol types, a set of transaction identifiers, a set of geo-locations of devices, etc.

As mentioned above, the feature extractor 16 is configured to compute a behavioral dataset based on the data stream provided as an input to the preprocessing module 6.

In this case, the feature extractor 16 is configured to output a behavioral dataset including, for each predetermined behavioral feature, the corresponding computed value.

More precisely, during the training step, the augmented behavioral dataset corresponding to each reference data stream 10 is referred to as a "reference behavioral dataset 24".

Moreover, during the inference step, the augmented behavioral dataset corresponding to the monitored data stream 4 is referred to as an "monitored behavioral dataset 26".

Conformity Processor 18

The conformity processor 18 is configured to compute a value of at least one predetermined non-conformity feature, based on each input data stream 4, 10.

Preferably, in at least one embodiment, the conformity processor 18 is configured to further compute the value of at least one non-conformity feature based on the behavioral dataset 24, 26 output by the feature extractor 16.

Each non-conformity feature has been designed so that its value changes depending on the absence or the presence of anomalies in the data stream and/or in the behavioral dataset. Moreover, each non-conformity feature is designed to capture meaning and significance of deviations specific to an application domain in a way that is natural and scalable for further processing by artificial intelligence models. Such non-conformity features are intended to complement behavioral features with additional semantic information regarding when and how much deviation from a corresponding baseline is important and relevant for a given application domain. Such non-conformity features therefore aim to improve accuracy of anomaly detection on border areas between legitimate and anomalous behavior, reduce complexity and processing time of models.

Each non-conformity feature may be a numerical feature (i.e., a non-conformity feature that may assume numeric values) or a categorical feature (i.e., a non-conformity feature that may only assume a finite predetermined number of possible values).

Examples of numerical non-conformity features may include: a minimum, a maximum, a standard deviation, a mean value, or other statistics over the input data stream 4, 10.

In this case, each numerical non-conformity feature may be an integer or a real number.

Moreover, each categorical non-conformity feature may relate to valid sets (i.e., allowed combinations) of observable elements from a given environment. For instance, categorical non-conformity features may include: valid sets of specific IDs of devices, network nodes, processes, port numbers, protocol types, geo-locations, and the like.

Categorical non-conformity features may also relate to sets of combined categorical features and/or numerical features, and may therefore include: a set of valid pairs of IDs representative of valid interactions or communications (such as those between devices, processes or network nodes), or a set of tuples of valid IDs, such as a set of tuples <IP source, IP destination, service port number, protocol type, virtual local area network, network device>, and the like.

In this case, the value of a given categorical non-conformity feature may be a Boolean that is equal to 0 if the input data stream and/or behavioral dataset is compliant with said non-conformity feature, and equal to 1 if not (e.g., if an expected feature value, such as an IP address, is not seen in the input data stream and/or behavioral dataset).

Preferably, in at least one embodiment, each non-conformity feature has been previously set by an operator.

Indeed, designing non-conformity features requires specific knowledge of an application domain and understanding what system behavioral aspects imply particular sensitivity to deviations.

As mentioned previously, non-conformity features are designed as a function of behavioral features and/or other system behavioral aspects determined based on the input data stream. Consequently, designing non-conformity features is a domain-specific problem solving.

Generally, all behavioral features are subject to anomaly detection upon significant deviations that may be observed, for instance, by an artificial intelligence model. However, the significance of deviations for some behavioral features is vastly different from others, and, consequently, requires corresponding non-conformity features defined to make the artificial intelligence model decisive on such small-scale deviations.

Nevertheless, an underlying principle for the design of non-conformity features with respect to a set of behavioral features can be defined if significant meaning of small-scale deviations (range of values) is determined.

As an illustrative example: specific industrial control protocols in the power grid management domain are particularly sensitive to sustain packet frequency (e.g., packets per millisecond) and any small-scale deviation beyond the normal baseline is indicative of anomaly. In this case, sustain packet frequency may be considered as a non-conformity feature.

As another example, in the domain of payment systems, the success rate of transactions (e.g., the fraction of successful transactions by total transactions) exhibits specific significance of deviations if dropped below an observed baseline versus deviations of other behavioral features. In this case, transaction success rate may be considered as a non-conformity feature for fine-grained anomaly detection.

Training Step

The conformity processor 18 is configured to compute, during the training step, a value of at least one predetermined non-conformity feature, based on each reference data stream 10, by way of one or more embodiments.

Advantageously, the conformity processor 18 is further configured to compute the value of at least one non-conformity feature based on the reference behavioral dataset 24.

Computing the value of at least one non-conformity feature based on the reference behavioral dataset 24 is advantageous. Indeed, such feature boosts optimization and efficiency of the conformity processor's computing capacity when indexing (i.e., computing a value of) each non-conformity feature related to a predetermined set of behavioral features present in said reference behavioral dataset 24, compared to computing said behavioral features on its own. Furthermore, using the reference behavioral dataset 24 facilitates synchronization of the sampling frequency of the non-conformity features with the sampling frequency of the behavioral features in the reference behavioral dataset 24.

Moreover, during the training step, for each non-conformity feature, the conformity processor 18 is configured to write, in the memory 20, the corresponding computed value as a conformity index.

For each non-conformity feature, in the case where several values are computed, each corresponding to a respective reference data stream 10, the conformity index stored in the memory 20 is determined based on said several values. For instance, the conformity index stored in the memory 20 is a combination of the plurality of computed values, for instance a mean of said computed values or upper or lower bound of said computed values.

Advantageously, at least one non-conformity feature is associated with a corresponding index tolerance factor, indicative of how much permissive or restrictive the conformity processor 18 may be regarding deviations of the computed value of said non-conformity feature, during the inference step, with respect to the corresponding conformity index.

Such index tolerance factor represents environment dynamics or expected behavior variations with respect to a normal behavior (represented by the corresponding conformity index). Such index tolerance factor provides an effective means to minimize false alarms (false positives) and establishes proper border areas between legitimate (i.e., normal) and anomalous behaviors.

Each index tolerance factor may be expressed as a percentage by which a given conformity index is increased or decreased, resulting in an updated conformity index representing a more permissive or restrictive border, beyond which deviations are indicative of anomalous behavior. According to another example, the index tolerance factor is a weight.

Preferably, each index tolerance factor has been previously set by an operator.

Furthermore, during the training step, the conformity processor 18 is configured to output, for each non-conformity feature, a corresponding deviation value equal to zero.

Inference Step

Preferably, the conformity processor 18 is configured to compute, during the inference step, a value of each predetermined non-conformity feature, based on the monitored data stream 4.

Advantageously, the conformity processor 18 is further configured to compute the value of at least one non-conformity feature based on the monitored behavioral dataset 26. The advantages provided by such feature are the same as those relating to the computation of each non-conformity feature based on the reference behavioral datasets 24, i.e., a reduced computational load that the conformity processor 18.

Moreover, during the inference step, for each non-conformity feature, the conformity processor 18 is configured to load, from the memory 20, the corresponding conformity index.

Preferably, if at least one non-conformity feature is associated with a corresponding index tolerance factor, the conformity processor 18 is further configured to update the corresponding conformity index based on its associated index tolerance factor. In this case, the updated conformity index is simply referred to as "conformity index".

The conformity processor 18 is further configured to compute, for each non-conformity feature, a respective deviation value based on the respective (updated) conformity index and on the computed value of said non-conformity feature.

For instance, the deviation value may be equal to the difference between the computed value of a given non-conformity feature and the respective conformity index.

Alternatively, the deviation value may be equal to a percentage representative of a relative deviation of the computed value with regard to the conformity index.

According to another example, the deviation value may be a Boolean equal to 0 if the computed value of a given non-conformity feature corresponds to the respective conformity index, and equal to 1 otherwise.

Advantageously, at least one non-conformity feature is associated with a corresponding weight, also called "impact factor", that is stored in the memory 20.

In this case, for said non-conformity feature, the conformity processor 18 is further configured to:

- compute an intermediate result based on the respective conformity index and on the computed value of said non-conformity feature; and
- compute the corresponding deviation value as a result of weighting the intermediate result with the corresponding impact factor.

Such feature is advantageous, as an impact factor greater than 1 would result in additional sensitivity with regard to the corresponding non-conformity feature. Alternatively, the impact factor can also be used to scale down values of selected non-conformity features to prevent or lessen their dominance in anomaly detection.

The use of the impact factor is also advantageous in the case where feature scaling techniques (described below), such as standardization or normalization, are applied to data used for training artificial intelligence models, and for performing inference during the inference step based on said trained artificial intelligence models (as detailed below with reference to prediction module 8).

Indeed, given that the deviation values are set to 0 during the training step (absence of deviation with respect to the conformity indexes), feature scaling is rendered ineffective during the inference step if the deviation values are not scaled. Leveraging on this effect, and by associating an impact factor to a non-conformity feature, various levels of sensitivity are achieved, making selected non-conformity features more important to deviations from other non-conformity features. While feature scaling prevents dominance of large deviation values, the use of an impact factor offers means to introduce a desired level of dominance of non-conformity in the inference step, making the resulting trained model more sensitive to anomaly detection relative to the impact factors chosen.

Furthermore, during the inference step, the conformity processor 18 is configured to output, for each non-conformity feature, the corresponding computed deviation value.

Formatting Module 22

For each input data stream 4, 10, the formatting module 22 is configured to generate a respective augmented behavioral dataset. More precisely, such augmented behavioral dataset includes the behavioral dataset associated with said input data stream 4, 10, and, for each non-conformity feature, the respective computed deviation value.

For instance, for each input data stream 4, 10, the formatting module 22 is configured to generate the respective augmented behavioral dataset by concatenating the corresponding behavioral dataset and the deviation value associated with each non-conformity feature.

More precisely, during the training step, for each reference data stream 10, the formatting module 22 is configured to generate a respective reference augmented behavioral dataset 12 including the respective reference behavioral dataset 24 and, for each non-conformity feature, a respective deviation value equal to zero.

Preferably, during the inference step, the formatting module 22 is configured to generate a monitored augmented behavioral dataset 14 associated with the monitored data stream 4. In this case, the monitored augmented behavioral dataset 14 includes the respective monitored behavioral dataset 26 and, for each non-conformity feature, the respective computed deviation value.

Prediction Module 8

The prediction module 8 is configured to train, during the training step, an artificial intelligence model based on each reference augmented behavioral dataset 12. In this case, each reference augmented behavioral dataset 12 is associated with information indicative of the absence of anomaly in the corresponding reference data stream 10.

For instance, in the context of supervised learning, such information may be included in a label associated with a given reference augmented behavioral dataset.

In other settings, such as unsupervised learning, labels are not explicitly needed for operation and training. In this case, for a given reference augmented behavioral dataset, the aforementioned information may rather be meaning for the absence of anomalies.

As a result, a trained anomaly detection model 28 is obtained.

Preferably, before training the artificial intelligence module, the prediction module 8 is configured to perform feature scaling on the datasets received from the preprocessing module 6.

By "feature scaling", it is meant, in the context of one or more embodiments of the invention, a set of preprocessing techniques, such as standardization or normalization, used in the field of artificial intelligence to transform the values of an input feature to a similar range with respect to other input features. Benefits of feature scaling include meaningful comparison among features, stabilization and precision of algorithms, prevention of dominance of large values, and the like.

Moreover, the prediction module 8 is configured to provide, during the inference step, the monitored augmented behavioral dataset 14 as input to the trained anomaly detection model 28. In this case, an output of the trained anomaly detection model 28 is representative on the presence of an anomaly (or the absence thereof) in the monitored data stream 4.

The system 2, in one or more embodiments, may be implemented on a single device or be distributed on multiple devices, servers, or computing platforms when deemed advantageous for convenience of processing capacity.

For instance, the pre-processing module 6 may operate on one device, server, or computing platform near source 5 of data streams 10, 4, while the prediction module 8 may operate on another device, server or computing platform (e.g., in the cloud).

Alternatively, or in addition, the feature extractor 16 may operate on one device, server, or computing platform, while the conformity processor 18 may operate on another device, server or computing platform.

Operation

Operation of the system 2 will now be described with reference to FIG. 1 (training step) and FIG. 2 (inference step), according to one or more embodiments of the invention.

Training Step

During the training step, the preprocessing module 6 receives at least one reference data stream 10, representative of a normal operation of at least one asset 5.

Then, for each received reference data stream 10, the feature extractor 16 computes a corresponding reference behavioral dataset 24, based on said reference data stream 10.

As mentioned previously, for each reference data stream 10, the corresponding reference behavioral dataset 24 includes, for each predetermined behavioral feature, a corresponding value computed based on said reference data stream 10.

Moreover, for each reference data stream 10, the conformity processor 18 computes a value of each predetermined non-conformity feature, based on said reference data stream 10 and/or on the corresponding reference behavioral dataset 24 output by the feature extractor 16.

Then, for each non-conformity feature, the conformity processor 18 writes, in the memory 20, the corresponding computed value as a conformity index.

Furthermore, the conformity processor 18 outputs, for each non-conformity feature, a corresponding deviation value equal to zero.

Furthermore, for each input reference data stream 10, the formatting module 22 generates the respective reference augmented behavioral dataset 12, which includes the respective reference behavioral dataset 24 and, for each non-conformity feature, the respective deviation value equal to zero.

Then, the prediction module 8 trains an artificial intelligence model based on each reference augmented behavioral dataset 12. In this case, each reference augmented behavioral dataset 12 is associated with information indicative of the absence of anomaly in the corresponding reference data stream 10.

As a result, a trained anomaly detection model 28 is obtained.

Inference Step

During the inference step, a monitored data stream 4, representative of the operation of at least one monitored asset 5, is provided to the preprocessing module 6.

Then, the feature extractor 16 computes a monitored behavioral dataset 26, based on the monitored data stream 4. Said monitored behavioral dataset includes, for each predetermined behavioral feature, the corresponding value computed based on the monitored data stream 4.

Moreover, the conformity processor 18 computes a value of each predetermined non-conformity feature, based on the monitored data stream 4 and/or on the associated monitored behavioral dataset 26 output by the feature extractor 16.

Moreover, for each non-conformity feature, the conformity processor 18 loads, from the memory 20, the corresponding conformity index.

Preferably, if at least one non-conformity feature is associated with a corresponding index tolerance factor, the conformity processor 18 updates the corresponding loaded conformity index based on its associated index tolerance factor. As mentioned previously, the updated conformity index is simply referred to as "conformity index".

Furthermore, for each non-conformity feature, the conformity processor 18 computes the associated deviation value based on the corresponding conformity index, and outputs the computed deviation value.

Then, the formatting module 22 generates the monitored augmented behavioral dataset 14, which includes the monitored behavioral dataset 26 and, for each non-conformity feature, the respective computed deviation value.

Then, the prediction module 8 provides the monitored augmented behavioral dataset 14 as input to the trained anomaly detection model 28.

In this case, an output of the trained anomaly detection model 28 is representative on the presence of an anomaly (or the absence thereof) in the monitored data stream 4.

Of course, the one or more embodiments of the invention are not limited to the examples detailed above.

The invention claimed is:

1. A computer-implemented anomaly detection method for detecting anomalies in a data stream, the computer-implemented anomaly detection method comprising:

a training step comprising based on at least one reference data stream, each reference data stream of said at least one reference data stream corresponding to an operation of at least one asset without anomaly, computing a value of at least one predetermined non-conformity feature;

for each non-conformity feature of said at least one predetermined non-conformity feature, storing a corresponding computed value as a conformity index;

for said each reference data stream, computing a reference behavioral dataset including, for at least one predetermined behavioral feature, a value of said at least one predetermined behavioral feature computed based on said each reference data stream;

for said each reference data stream, generating a respective reference augmented behavioral dataset including the reference behavioral dataset corresponding thereto and, for said each non-conformity feature, a respective deviation value equal to zero, wherein the respective deviation value is equal to zero in an absence of deviation from a corresponding baseline for the respective non-conformity feature; and training an artificial intelligence model based on said respective reference augmented behavioral dataset of said each reference data stream, said respective reference augmented behavioral dataset of said each reference data stream being associated with information indicative of an absence of anomaly in the each reference data stream corresponding thereto, thereby obtaining a trained anomaly detection model, wherein, during an inference step for at least one monitored data stream, a monitored augmented behavioral dataset including a monitored behavioral dataset and, for each non-conformity feature, the respective deviation value that is computed during the inference step, is provided as input to the trained anomaly detection model, and the trained anomaly detection model outputs an indication of a presence or an absence of an anomaly in the at least one monitored data stream.

2. The computer-implemented anomaly detection method according to claim 1, wherein the inference step further comprises, for said at least one monitored data stream, computing a current value of said each non-conformity feature of said at least one predetermined non-conformity feature, based on said at least one monitored data stream;

for said each non-conformity feature, computing the respective deviation value based on the conformity index corresponding thereto and on the current value that is computed of said each non-conformity feature;

computing the monitored behavioral dataset including, for each predetermined behavioral feature of said at least one predetermined behavioral feature, a value of said each predetermined behavioral feature that is computed based on said at least one monitored data stream; and generating the monitored augmented behavioral dataset by combining the monitored behavioral dataset and, for said each non-conformity feature, the respective deviation value that is computed.

3. The computer-implemented anomaly detection method according to claim 2, wherein said each non-conformity feature is associated with a corresponding impact factor, the respective deviation value associated with said each non-conformity feature being equal to a result of weighting, with the corresponding impact factor, an intermediate result computed based on the conformity index corresponding thereto and on the current value of said each non-conformity feature.

4. The computer-implemented anomaly detection method according to claim 2, wherein at least one conformity index is associated with a corresponding index tolerance factor, the respective deviation value depending on the conformity index corresponding thereto updated based on the corresponding index tolerance factor.

5. A non-transitory computer-readable medium storing thereon a computer program comprising instructions, which when executed by a computer, cause the computer to carry out a computer-implemented anomaly detection method for detecting anomalies in a data stream, said computer-implemented anomaly detection method comprising:

a training step comprising based on at least one reference data stream, each reference data stream of said at least one reference data stream corresponding to an operation of at least one asset without anomaly, computing a value of at least one predetermined non-conformity feature;

for each non-conformity feature of said at least one predetermined non-conformity feature, storing a corresponding computed value as a conformity index;

for said each reference data stream, computing a reference behavioral dataset including, for at least one predetermined behavioral feature, a value of said at least one predetermined behavioral feature computed based on said each reference data stream;

for said each reference data stream, generating a respective reference augmented behavioral dataset including the reference behavioral dataset corresponding thereto and, for said each non-conformity feature, a respective deviation value equal to zero, wherein the respective deviation value is equal to zero in an absence of deviation from a corresponding baseline for the respective non-conformity feature; and training an artificial intelligence model based on said respective reference augmented behavioral dataset of said each reference data stream, said respective reference augmented behavioral dataset of said each reference data stream being associated with information indicative of an absence of anomaly in the each reference data stream corresponding thereto, thereby obtaining a trained anomaly detection model, wherein, during an inference step for at least one monitored data stream, a monitored augmented behavioral dataset including a monitored behavioral dataset and, for each non-conformity feature, the respective deviation value that is computed during the inference step, is provided as input to the trained anomaly detection model, and the trained anomaly detection model outputs an indication of a presence or an absence of an anomaly in the at least one monitored data stream.

6. A system that performs anomaly detection in a monitored data stream, the system comprising:

a processor implemented on a device and configured to, during a training step, compute a value of at least one predetermined non-conformity feature based on at least one reference data stream, each reference data stream of said at least one reference data stream corresponding to an operation of at least one asset without anomaly;

store, for each non-conformity feature of said at least one predetermined non-conformity feature, the value that is computed as a conformity index;

compute, for said each reference data stream, a reference behavioral dataset including, for at least one predetermined behavioral feature, a value of said at least one predetermined behavioral feature being computed based on said each reference data stream;

generate, for said each reference data stream, a respective reference augmented behavioral dataset including the reference behavioral dataset corresponding thereto and, for said each non-conformity feature, a respective deviation value equal to zero, wherein the respective deviation value is equal to zero in an absence of deviation from a corresponding baseline for the respective non- conformity feature; and train an artificial intelligence model based on said respective reference augmented behavioral dataset associated with said each reference data stream, said respective reference augmented behavioral dataset being associated with information indicative of an absence of anomaly in the each reference data stream, thereby obtaining a trained anomaly detection model;

wherein the processor is further configured to, during an inference step, provide a monitored augmented behavioral dataset including a monitored behavioral dataset and, for each non-conformity feature, the respective deviation value that is computed during the inference step as input to the trained anomaly detection model, the trained anomaly detection model outputting an indication of a presence or an absence of an anomaly in the monitored data stream.

7. The system according to claim 6, being further configured to, during the inference step, compute a current value of said each non-conformity feature of said at least one predetermined non-conformity feature, based on the monitored data stream;

compute, for said each non-conformity feature, the respective deviation value based on the conformity index associated therewith and on the current value that is computed of said each non-conformity feature;

compute the monitored behavioral dataset including, for each predetermined behavioral feature of said at least one predetermined behavioral feature, a value of said each predetermined behavioral feature that is computed based on said monitored data stream; and generate the monitored augmented behavioral dataset by combining the monitored behavioral dataset that is computed and, for said each non-conformity feature, the respective deviation value that is computed.

* * * * *